(12) United States Patent
Rabinowitz

(10) Patent No.: US 7,187,490 B2
(45) Date of Patent: Mar. 6, 2007

(54) INDUCED DIPOLE ALIGNMENT OF SOLAR CONCENTRATOR BALLS

(76) Inventor: Mario Rabinowitz, 715 Lakernead Way, Redwood City, CA (US) 94062

( * ) Notice: Subject to any disclaimer, the term of this patent is extended or adjusted under 35 U.S.C. 154(b) by 220 days.

(21) Appl. No.: 11/031,304

(22) Filed: Jan. 7, 2005

(65) Prior Publication Data

US 2006/0150968 A1    Jul. 13, 2006

(51) Int. Cl.
*G02B 26/00* (2006.01)

(52) U.S. Cl. ............... 359/296; 359/872; 359/873; 359/851

(58) Field of Classification Search ........... 359/296
See application file for complete search history.

(56) References Cited

U.S. PATENT DOCUMENTS

| | | | | |
|---|---|---|---|---|
| 3,670,323 A | 6/1972 | Sobel et al. | ............ | 340/324 R |
| 4,261,653 A | 4/1981 | Goodrich | ............ | 359/296 |
| 5,717,515 A | 2/1998 | Sheridon | ............ | 359/296 |
| 5,754,332 A | 5/1998 | Crowley | ............ | 359/296 |
| 5,777,782 A * | 7/1998 | Sheridon | ............ | 359/296 |
| 5,808,783 A | 9/1998 | Crowley | ............ | 359/296 |
| 5,815,306 A | 9/1998 | Sheridon et al. | ............ | 359/296 |
| 5,914,805 A | 6/1999 | Crowley | ............ | 359/296 |
| 6,197,228 B1 | 3/2001 | Sheridon | ............ | 264/136 |
| 6,211,998 B1 | 4/2001 | Sheridon | ............ | 359/296 |
| 6,222,513 B1 | 4/2001 | Howard et al. | ............ | 345/84 |
| 6,243,058 B1 | 6/2001 | Mikkelsen et al. | ............ | 345/84 |
| 6,249,271 B1 | 6/2001 | Albert et al. | ............ | 345/107 |
| 6,262,707 B1 | 7/2001 | Sheridon | ............ | 345/111 |
| 6,335,818 B1 | 1/2002 | Torres | ............ | 359/296 |
| 6,421,035 B1 * | 7/2002 | Sheridon et al. | ............ | 345/85 |
| 6,570,700 B2 | 5/2003 | Engler et al. | ............ | 359/296 |
| 6,612,705 B1 | 9/2003 | Davidson et al. | ............ | 359/851 |
| 6,843,573 B2 | 1/2005 | Rabinowitz et al. | ............ | 359/851 |
| 6,964,486 B2 * | 11/2005 | Rabinowitz | ............ | 359/851 |
| 2002/0131151 A1 | 9/2002 | Engler et al. | ............ | 359/296 |
| 2003/0192998 A1 | 10/2003 | Davidson et al. | ............ | 359/850 |
| 2003/0193726 A1 | 10/2003 | Davidson et al. | ............ | 244/172 |
| 2003/0202235 A1 | 10/2003 | Rabinowitz et al. | ............ | 359/296 |
| 2005/0168850 A1 * | 8/2005 | Rabinowitz et al. | ............ | 359/851 |

* cited by examiner

*Primary Examiner*—Jordan Schwartz
*Assistant Examiner*—Jessica Stultz

(57) ABSTRACT

The instant invention is concerned with method and apparatus for induced dipole alignment of solar concentrator micro-mirrors. Novel method and apparatus are taught for coupling to, addressing, and alignment of a micro-optics solar concentrator system for single-axis and two-axis tracking. Mirrored micro-balls are covered with a thin spherical shell of lubricating liquid so that they are free to rotate in an almost frictionless encapsulation in the sheet. Novel method and apparatus are presented for matching the overall ball density with that of the lubricating fluid. Broadly this invention deals with novel concepts used for alignment in the focussing of light wherever mirrors are used for focussing such as for solar propulsion assist, illumination and projection of light, optical switching, etc. A particularly important objective is the focussing of sunlight for solar power conversion and production.

20 Claims, 2 Drawing Sheets

US 7,187,490 B2

INDUCED DIPOLE ALIGNMENT OF SOLAR CONCENTRATOR BALLS

INCORPORATION BY REFERENCE

The following U.S. patents, allowed patent applications, and pending patent applications are fully incorporated herein by reference:
1. U.S. Pat. No. 6,738,176, by Mario Rabinowitz and Mark Davidson, "Dynamic Multi-Wavelength Switching Ensemble" issued on May 18, 2004.
2. U.S. Pat. No. 6,612,705, by Mark Davidson and Mario Rabinowitz, "Mini-Optics Solar Energy Concentrator" issued on Sep. 2, 2003.
3. U.S. Pat. No. 6,698,693 by Mark Davidson and Mario Rabinowitz, "Solar Propulsion Assist" issued on Mar. 2, 2004.
4. U.S. Publication #2003-0193726-A1, by Mark Davidson and Mario Rabinowitz, "Active Reflection, Illumination, and Projection" published on Oct. 16, 2003.
5. U.S. Publication #Not Designated Yet, by Mario Rabinowitz, "Spinning Concentrator Enhanced Solar Energy Alternating Current Producton" is Pending.
6. U.S. Publication #Not Designated Yet, by Mario Rabinowitz, "Manufacturing Transparent Mirrored Mini-Balls for Solar Energy Concentration and Analogous Applications" is Pending.
7. U.S. Publication #Not Designated Yet, by Mario Rabinowitz, "Advanced Micro-Optics Solar Energy Collection System" is Pending.
8. U.S. Publication #Not Designated Yet, by Mario Rabinowitz, "Alignment of Solar Concentrator Micro-Mirrors" is Pending.
9. U.S. Publication #Not Designated Yet, by Mario Rabinowitz and Felipe Garcia, "Group Alignment Of Solar Concentrator Micro-Mirrors" is Pending.
10. U.S. Publication #2004-0021964-A1, by Mario Rabinowitz and Mark Davidson "Mini-Optics Solar Energy Concentrator" allowed for issuance.
11. U.S. Publication #Not Designated Yet, by Mario Rabinowitz and David V. Overhauser, "Manufacture and Apparatus for Nearly Frictionless Rotatable Array of Micro-Mirrors in a Solar Concentrator Sheet" is Pending.
12. U.S. Publication #Not Designated Yet, by Mario Rabinowitz, "Improved Micro-Optics Solar Energy Concentrator" is Pending.

BACKGROUND OF THE INVENTION

This invention provides a low cost means for achieving affordable solar energy by greatly reducing the cost of solar concentrators which increase (concentrate) the density of solar energy incident on the solar energy converter. A limiting factor in the utilization of solar energy is the high cost of energy converters such as photovoltaic cells. For example, for the purpose of generating electricity, a large area of expensive solar cells may be replaced by a small area of high-grade photovoltaic solar cells operating in conjunction with the inexpensive intelligent micro-optics of this invention. Thus the instant invention can contribute to the goal of achieving environmentally clean energy on a large enough scale to be competitive with conventional energy sources.

The rotatable elements of this invention are mirrored balls and cylinders. As derived in U.S. Pat. No. 6,612,705 of which the inventor of this instant invention is the co-inventor, balls in a square array have a packing fraction of 0.785 and 0.907 in an hexagonal array. Balls have an advantage over cylinders in that they can operate in either a single-axis or two-axis tracking mode. Cylinders have an advantage over balls in that they can have a packing fraction of nearly 1, but they are limited to a single-axis tracking mode.

The instant invention operates by the induced dipole alignment of solar concentrator balls such that the dipole that is induced in the dielectric material surrounding a mirror acts in harmony with the induced dipole in each mirror. An external applied electric field E induces a dipole by polarizing the dielectric to partially cancel the field E inside the dielectrc. In an applied electrostatic field, E, a dipole moment is induced in the metallic conducting material of the micro-mirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. The electrostatic field induces and aligns the electrostatic dipoles of the dielectric and mirrors in a way somewhat analogous to an induced magnetic dipole in a pivoted ferromagnetic material in a magnetic field. When pivoted, a high aspect ratio (length to thickness ratio) ferromagnetic material becomes polarized and rotates to align itself parallel to an external magnetic field. Similarly an electrostatic field polarizes and aligns each dielectric ball and mirror. The mirror has a high aspect ratio of diameter to thickness. The ball is bifurcated into two semi-balls, each of which has a high aspect ratio of diameter to thickness.

If alignment is attempted in a conventional manner such as is used in Gyricon displays, the induced polarization electric dipole fields of mirror and dielectric ball presents a dilemma since it is perpendicular to the zeta potential produced dipole field and the net vector is in neither direction. The "zeta potential," is the net surface and volume charge that lies within the shear slipping surface resulting from the motion of a body through a liquid. The zeta potential is an electrical potential that exists across the interface of all solids and liquids. It is also known as the electrokinetic potential. The zeta potential produces an electric dipole field when a sphere is made from two dielectrically different hemispheres due to their interaction with the fluid surrounding it. In the instant invention, no problem arises by making both semi-spheres (semi-balls) out of the same transparent material to eliminate or minimize the zeta potential. It would be quite difficult for Gyricon displays to make the surface of both hemispheres out of the same material because they require optically different surfaces e.g. black and white, or e.g. cyan, magenta, and yellow for color mixing.

The topic of the dipole interactions between balls seems not to have been discussed in the Gyricon patents and literature. A heuristic analysis shows that this is not a serious problem. The electric field strength of a dipole, $E_d$ is proportional to $1/r^3$, where r is the radial distance from the center of the dipole. The energy in the field is proportianal to $(E_d)^2$. Thus the energy of a dipole field varies as $1/r^6$. The force is proportional to the gradient of the field, and hence varies as $1/r^7$. With such a rapid fall off of the dipole interaction force, it can generally be made very small compared to the force due to the applied field E, and to the frictional forces that are normally present. Therefore interaction of the dipole field forces between mirrored elements (balls or cylinders) can generally be made negligible. The term "element" or "ball" will herein be used to represent the general concept of spheroids and cylinders. Although the primary application of the instant invention is for a solar concentrator application, there are a number of other applications such as mirrored illumination and projection, optical switching, solar propulsion assist, etc.

The 1998 Gyricon U.S. Pat. No. 5,717,515 of Sheridon, entitled "Canted Electric Fields for Addressing a Twisting Ball Display" is exclusively concerned with Displays. There appears to be no mention of any other application than directly viewed Displays, either specifically or by general statement. In this Sheridon patent, no mention is made of a mirror in the gyricon balls, nor is there any mention of specular reflection as would be obtained from a mirror. On the contrary, means are discussed to increase diffuse reflection from the balls so the Gyricon display may easily be observed from all angles. Certainly there is no anticipation of a solar concentrator application, mirrored illumination and projection, optical switching, solar propulsion assist, or any other micro-mirror application.

Furthermore Gyricon patents have no mention of coupling means to the balls other than by means of the zeta potential dipole, or an embedded electret dipole both of which are parallel to the Gyricon axis of symmetry which in the case of black and white balls goes through the vertex of the black hemisphere, the center of the sphere, and the vertex of the white hemisphere. Also there is no mention of an induced polarization electric dipole in the dielectric of their balls; and they have no mirrors in which to induce a dipole. Furthermore, their zeta potential dipole is parallel to the Gyricon axis of symmetry, whereas in the instant invention the induced polarization electric dipoles of dielectric and mirror are perpendicular to the axis of symmetry. Thus the application of the same electric field in the instant invention produces an entirely different orientation or alignment than in the Sheridon patent.

The instant invention differs substantially from that of Sheridon and from that of Goodrich U.S. Pat. No. 4,261,653 in the use of: mirrored elements (balls and cylinders); induced polarization electric dipoles in the mirrors and elements; the dipole fields being perpendicular to the axis of symmetry (rather than parallel); the use of fragmented wire electrodes to provide greater transparency; and the combination of fragmented wire electrodes and partitioned electrodes to provide greater transparency of the active surface than in the Sheriron patent.

The instant invention is primarily concerned with method and apparatus for the alignment of solar concentrator micro-mirrors. However, it has broader applications wherever mirrors are used for focussing such as for solar propulsion assist, illumination and projection of light, optical switching, etc.

DEFINITIONS

"Bipolar" refers herein to either a magnetic assemblage with the two poles north and south, or an electric system with + and − charges separated as in an electret.

"Concentrator" as used herein in general is a micro-mirror system for focussing and reflecting light. In a sollar energy context, it is that part of a solar Collector system that directs and concentrates solar radiation onto a solar Receiver.

"Concentration factor" is < or ~ of the ratio of the area of the concentrator to that of the area of the receiver. It is the factor such as 10×, 100×, etc. by which the solar flux is concentrated at the receiver relative to the ordinary solar flux.

"Dielectric" refers to an insulating material in which an electric field can be sustained with a minimum power dissipation. [Most transparent materials are dielectrics. However Indium/Tin Oxide (also called ITO in the literature) is a conductor that is also transparent.]

"Elastomer" is a material such as synthetic rubber or plastic, which at ordinary temperatures can be stretched substantially under low stress, and upon immediate release of the stress, will return with force to approximately its original length.

"Electret" refers to a solid dielectric possessing persistent electric polarization, by virtue of a long time constant for decay of charge separation.

"Element" or 'ball' refers to the basic mirrored component of the instant invention which in a broad sense are spheroids and cylinders.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"ITO" is a conducting alloy of Indium/Tin Oxide that is transparent.

"Packing fraction" herein refers to the fraction of an available area occupied by the collection (ensemble) of rotatable elements.

"Receiver" as used herein in general is a system for receiving reflected light. In a solar energy context, it receives concentrated solar radiation from the micro-mirror assembly for the conversion of solar energy into more conveniently usable energy such as electricity.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Zeta potential," is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres due to the interaction of the sphere with the fluid that it is immersed in.

SUMMARY OF THE INVENTION

There are many objects, aspects, and applications of this invention. Broadly this invention deals with the general concept of method and apparatus for focussing light by using mirrors. A particularly important object is the alignment of micro-mirrors for the focussing of sunlight in power conversion and production. Accordingly, other aspects and advantages are given below.

A particularly important aspect is to provide a unique tracking and focussing system for solar power conversion.

Another aspect is to provide the options of single-axis tracking or two-axis tracking by the concentrator micro-mirrors for different applications.

Another aspect is to provide induced dipole coupling to the dielectric of the rotatable mirrored balls.

Another aspect is to provide induced dipole coupling to the mirror of the rotatable mirrored balls.

Another aspect is to provide a means for matching the ball density with that of the surrounding lubricating fluid.

Another aspect is to provide a rugged system for conversion of solar energy to heat.

Another aspect is to provide electricity for both mobile and stationary communications systems.

Another aspect is to provide large-scale environmentally clean energy.

Another aspect is to help in the industrialization of developing countries.

Another aspect is to provide a low-cost, tough, light-weight, concentrated efficient solar energy converter that is highly portable.

Another aspect is to provide a minitiarized quasi-planar heliostat field configuration that can track the sun.

Another aspect is to provide a portable system that can easily go anywhere man can go, to track and concentrate the sun's energy.

Other aspects, objects and advantages of the invention will be apparent in a description of specific embodiments thereof, given by way of example only, to enable one skilled in the art to readily practice the invention as described hereinafter with reference to the accompanying drawings. In accordance with the illustrated preferred embodiments, method and apparatus are presented that are capable of producing alignment and mirror reflection of a source of light such as sunlight.

DETAILED DESCRIPTION OF THE PRESENTLY PREFERRED EMBODIMENTS

Figure 1A:
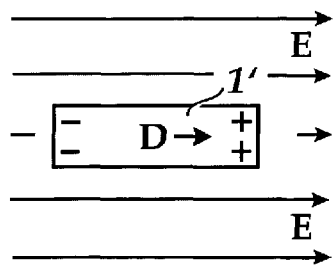
FIG. 1a is a cross-sectional view of a rotatable dielectric bar of high aspect ratio.

FIG. 1a is a cross-sectional view of a rotatable dielectric bar 1' of high aspect ratio, in an applied external electric field E. The electric field E polarizes the bar 1' with an induced dipole moment D with positive charge + on the right and − charge on the left as shown. D points in the direction of E regardless of the initial orientation of the bar 1'. Because the bar 1' is constrained to only rotate, this dielectric bar will rotate to align itself in the direction of E, as shown, to lower the potential energy of the system. This is analogous to the rotation of a ferromagnetic bar in an applied magnetic field.

Figure 1B:
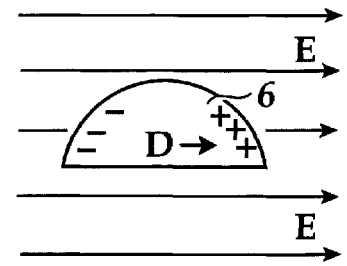
FIG. 1b is a cross-sectional view of a rotatable dielectric semi-ball of high aspect ratio.

FIG. 1b is a cross-sectional view of a rotatable dielectric semi-ball 6 of high aspect ratio, in an applied external electric field E. The electric field E polarizes the semi-ball 6 with an induced dipole moment D with positive charge + on the right and − charge on the left as shown. D points in the direction of E regardless of the initial orientation of the semi-ball 6. Because the semi-ball 6 is constrained to only rotate, it will rotate to align itself in the direction of E, as shown, to lower the potential energy of the system. Although the semi-ball 6, or an ellipsoidal dielectric has a curved surface(s) that is not parallel to the applied external electric field E, the dielectric aligns itself with its major axis parallel to E. This is analogous to the rotation of a ferromagnetic bar in an applied magnetic field.

Figure 1C:
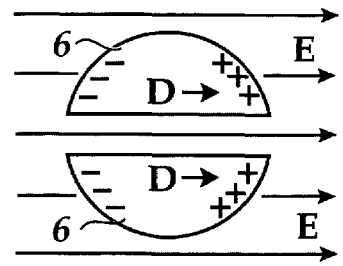
FIG. 1c is a cross-sectional view of a pair of separated rotatable dielectric semi-balls, each of which has a high aspect ratio.

FIG. 1c is a cross-sectional view of a pair of separated rotatable dielectric semi-balls 6, each of which has a high aspect ratio, in an applied external electric field E. The electric field E polarizes each semi-ball 6 with an induced dipole moment D with positive charge +on the right and − charge on the left as shown. D points in the direction of E regardless of the initial orientation of each semi-ball 6. Because the semi-balls 6 are constrained to only rotate, they will rotate to align themselves in the direction of E, as shown, to lower the potential energy of the system. Although each semi-ball 6 (or an ellipsoidal dielectric) has a curved surface(s) that is not parallel to the applied external electric field E, the dielectric aligns itself with its major axis generally parallel to E. This is analogous to the rotation of a ferromagnetic bar in an applied magnetic field. Although the combination of the two semi-balls 6 is approximately spherical with no major axis, this symmetry is broken by the presence of a gap or mirror between them giving the separate components major axes that align generally parallel to E, and hence to each other.

Figure 1D:
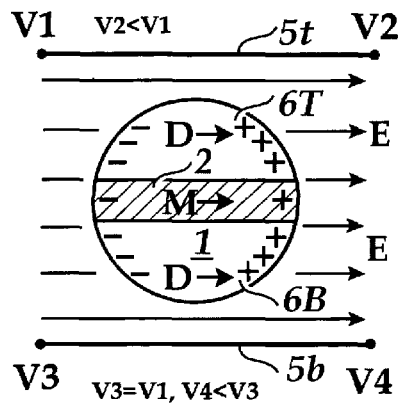
FIG. 1d is a cross-sectional view of a rotatable element consisting of an induced dipole mirror sandwiched between induced dipole dielectric semi-balls (semi-spheres or semi-cylinders), aligned parallel to partitioned electrodes where an ensemble of such elements are a major constituent of a micro-optics concentrator.

FIG. 1d is a cross-sectional view of a rotatable element 1 with a micro-mirror 2 aligned parallel to top partitioned highly resistive electrode 5t and bottom partitioned highly resistive electrode 5b, where an ensemble of such elements and electrodes are a major constituent of a micro-optics concentrator. The micro-mirror 2 is sandwiched between a dielectric top semi-ball 6T which must be transparent, and a bottom semi-ball 6B which is preferably transparent, but need not be. The inventor of this instant invention is the co-inventor of U.S. Pat. No. 6,612,705, in which the micro-optics concentrator is described in detail. The micro-mirror 2 is a shiny circular flat conducting metal of thickness d close to the equatorial plane of the elements 1. The partitioned electrodes and other types of electrodes are discussed in conjunction with FIGS. 2a, 2b, 3a, and 3b. A microprocessor sends signals via bus bars to establish voltages from a power supply to each partitioned electrode which is made of a highly resistive thin transparent conductor such as an alloy of indium tin oxide (ITO). For top partitioned electrode 5t, the left corner is at voltage V1 and the right corner is at voltage V2. For bottom partitioned electrode 5b, the left corner is at voltage V3 and the right corner is at voltage V4. A signal sets the voltages so that V3=V1, V4=V2, V2<V1, and V4<V3, to produce an approximately uniform applied electric field E parallel to the electrodes 5t and 5b as shown.

The electric field E polarizes the semi-balls 6T and 6B with an induced dipole moment D with positive charge + on the right and − charge on the left as shown. Similarly, the applied electric field E also induces an electric dipole moment M in the metallic conducting material of the micro-mirror 2. This is because when a metallic conductor is placed in an electric field, the charge distributes itself so as to produce a field free region inside the conductor. To internally cancel the applied field E, negative—free electrons move to the end of each conducting micro-mirror 2 opposite to the direction of E, leaving positive + charge at the end in the direction of E. The torque interaction of the induced electric dipole moment D of the dielectric and M of the micro-mirror 2 and the electric field E acts to align the micro-mirror 2 parallel to the electric field E as shown here in FIG. 1a. The torque is proportional to the product of E and the total vector dipole moment and will be analyzed following the detailed description of FIG. 1f. An electret(s) embedded in the dielectric may be used to augment the torque to overcome frictional effects.

The semi-balls 6T and 6B have the same dielectric constant which minimizes the effect of the zeta potential which has been previously discussed. In operating by means of an induced polarization dipole field, the instant invention operates by a substantially different mechanism than in Gyricon displays. The instant invention also differs substantially from Gyricon displays in terms of the axis of symmetry of the elements 1, i.e. the balls or cylinders. In Gyricon displays, the axis of symmetry of their balls and cylinders is parallel to the applied electric field since the zeta potential dipole is parallel to the applied electric field. In the instant invention, the axis of symmetry of the elements 1 is perpendicular to the applied electric field because the micro-mirrors 2 and hence the induced polarization dipole field is perpendicular to the axis of symmetry. It should be noted that here in FIG. 1a, the electric field E orientation is at right angles to that which is used in Gyricon displays. Here E is parallel to the equatorial plane of the balls and the top surface 5t which admits light. In traditional Gyricon displays, E is perpendicular to the Gyricon ball equatorial plane and to the top surface—the viewing surface which admits light.

Figure 1E:
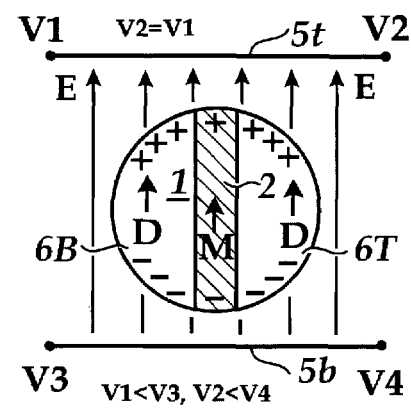
FIG. 1e is a cross-sectional view of a rotatable element consisting of an induced dipole mirror sandwiched between induced dipole dielectric semi-balls (semi-spheres or semi-cylinders), aligned perpendicular to partitioned electrodes where an ensemble of such elements are a major constituent of a micro-optics concentrator.

FIG. 1e is a cross-sectional view of a rotatable element 1 with a micro-mirror 2 aligned perpendicular to top partitioned highly resistive electrode 5t and bottom partitioned highly resistive electrode 5b, where an ensemble of such elements and electrodes are a major constituent of a micro-optics concentrator. The micro-mirror 2 is sandwiched between a dielectric top semi-ball 6T which must be transparent, and a bottom semi-ball 6B. For top partitioned electrode 5t, the left corner is at voltage V1 and the right corner is at voltage V2. For bottom partitioned electrode 5b, the left corner is at voltage V3 and the right corner is at voltage V4. A signal sets the voltages so that V2=V1, V4=V3, V1<V3, and V2<V4, an approximately uniform applied electric field E is produced perpendicular to the electrodes 5t and 5b as shown. The micro-mirror 2 aligns itself parallel to the applied electric field E due to the induced electric dipole moment D of the dielectric and induced electric dipole moment M of the micro-mirror 2, with positive charge + on the top and − charge on the bottom as shown.

Figure 1F:
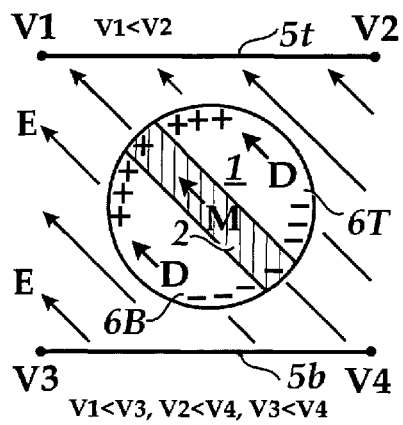
FIG. 1f is a cross-sectional view of a rotatable element consisting of an induced dipole mirror sandwiched between induced dipole dielectric semi-balls (semi-spheres or semi-cylinders), aligned at a tilted angle with respect to partitioned electrodes where an ensemble of such elements are a major constituent of a micro-optics concentrator.

FIG. 1f is a cross-sectional view of a rotatable element 1 with a micro-mirror 2 aligned at a tilted angle with respect to top partitioned highly resistive electrode 5t and bottom partitioned highly resistive electrode 5b, where an ensemble of such elements and electrodes are a major constituent of a micro-optics concentrator. The micro-mirror 2 is sandwiched between a dielectric top semi-ball 6T which must be transparent, and a bottom semi-ball 6B. For top partitioned electrode 5t, the left corner is at voltage V1 and the right corner is at voltage V2. For bottom partitioned electrode 5b, the left corner is at voltage V3 and the right corner is at voltage V4. A signal sets the voltages so that V1<V2, V3<V4, V1<V3, and V2<V4, an approximately uniform applied electric field E is produced that is tilted with respect to the electrodes 5t and 5b as shown. The micro-mirror 2 aligns itself parallel to the applied electric field E due to the induced electric dipole moment D of the dielectric and induced electric dipole moment M of the micro-mirror 2, with positive charge + and negative − charge at the ends as shown.

For balls, two-axis tracking is possible by additional alignment of the micro-mirrors 2 out of the plane of the paper. This is accomplished by similar voltage relationships to those already described as can be understood from the top and bottom electrode views shown in FIGS. 2 and 3. Cylinders would be restricted to single-axis tracking. The chosen alignment angle i.e. tilt angle of the rotatable elements 1 can be held in place by the containment sheets upon which the electrodes 5t and 5b are located. Thus during the interval between alignments, the alignment voltages may be switched off to conserve power. As described in U.S. Pat. No. 6,612,705 (of which the present inventor is a co-inventor), a plenum can be used to slightly force the containment sheets apart, as well as other means when a new alignment is desired. The containment sheets may be made of a thermoplastic such as an elastomer.

Examples of materials that are appropriate transparent dielectrics for making the elements 1 are: glass, polycarbonate, acrylic polymers made from acrylic derivatives such as acrylic acid, methacrylic acid, ethyl acrylate, methyl acrylate (some trade names are lexan, lucite, plexiglass, etc.). Glass is preferred for longevity in the ultraviolet environment of the sun, and low material cost. Its disadvantage is the higher cost of manufacturing equipment because of its high melting point and reactivity in the molten state. The above plastics are preferred because of their clarity (transparency) and ease of manufacture.

A rough and ready approximate equation for the torque on a mid-plane mirrored ball is $$\tau \approx \varepsilon V^2 \left[ \frac{\pi}{4} d + (K-1)\left(\frac{\pi}{3}r - \frac{\pi}{4}d\right)\right], \quad (1)$$

where $\tau$ is the torque in newton-meters, V is the applied grid voltage, r is the ball radius in meters, d is the mirror thickness in meters (d<2r), and K is the dielectric constant of the ball. For example 2<K<3 for Lucite. In the instant invention, both the mirror and the ball work together to contribute to the total torque. Depending on the relative values of d, r, and K, the mirror or the ball can dominate in the torque contribution. K≈n², where n is the index of refraction of the ball.

For a high packing density of balls, one needs to take into consideration the efficiency reduction due to blocking of light (shadowing) by one mirror on other. Worst case blocking is expected to occur when the incident light ray is normal to the concentrator and the exit ray is a grazing ray almost parallel to the plane of the concentrator at critical angle Θ, A worst case estimate for the efficiency factor f due to shadowing caused by high packing density is $$f \approx 1 - \sin\Theta \, tn(\Theta/2), \qquad (2)$$

where $\Theta<\pi/2$. The critical angle Θ for total internal reflection occurs for $\sin\Theta = 1/n$. Θ is the angle of reflection of the light with respect to the normal of the concentrator mirror array surface in going to the receiver. If the receiver is moved towards the normal to the mirror array, the efficiency factor f approaches 1. The efficiency factor f also gets larger, the larger n is.

Since $n \approx \sqrt{K}$, this is an incentive to use a dielectric for the balls with a large dielectric constant K to reduce shadowing effects. Fortunately nature is helpful here, as a larger K also produces a larger torque to align the balls as can be seen from the above torque equation (1). For large K>>1, the torque is approximately proportional to K so for example doubling K roughly doubles the torque, as can be seen from the torque equation (1). It is clearly preferable to use a dielectric for the balls with index of refraction n>1.2 and dielectric constant K>1.4. One has to be careful to use the high frequency value of K in converting to n, as n is for the extremely high frequencies for light. A low frequency value of K is adequate in the torque eq. (1).

Table 1 is indicative of the improvement in the efficiency factor by increasing the index of refraction or the dielectric constant of the ball, not to mention the increase of the torque for alignment. The numbers obtained from eq. (2) are approximate worst case.

TABLE 1

| n (Index of refraction) | f (Efficiency factor) | K (dielectric constant) |
|---|---|---|
| 1.2 | 0.553 | 1.44 |
| 1.3 | 0.639 | 1.69 |
| 1.4 | 0.700 | 1.96 |
| 1.5 | 0.745 | 2.25 |
| 1.6 | 0.781 | 2.56 |
| 1.7 | 0.809 | 2.89 |
| 1.8 | 0.831 | 3.24 |

Figure 1G:
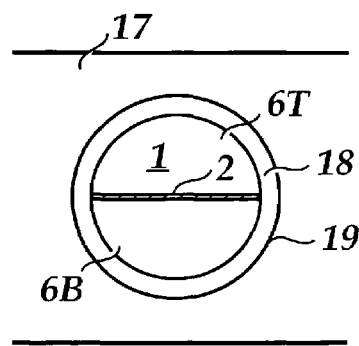
FIG. 1g is a cross-sectional view of a rotatable element with a micro-mirror sandwiched between a dielectric semi-balls. These elements are completely surrounded by a lubricating fluid which is encapsulated inside a concentric cavity.

FIG. 1g is a cross-sectional view of a rotatable element 1 with a micro-mirror 2. The micro-mirror 2 of thickness d is sandwiched between a dielectric top semi-ball 6T which must be transparent, and a bottom semi-ball 6B. The elements 1 are a major constituent of a micro-optics concentrator. The element 1 is completely surrounded by a lubricating fluid 18 which is encapsulated inside a concentric cavity 19. The cavities 19 are inside a transparent elastomer sheet 17, which is positioned between alignment electrodes as are described in conjunction with FIGS. 2a, 2b, 3a, and 3b. Thus the confined and lubricated element 1 can make a nearly frictionless rotation, with hardly any undesirable displacement. An ensemble of such elements can thus be aligned as a group with the application of moderate power. It is preferable to utilize a liquid 18 whose index of refraction matches the clear semi-sphere or clear semi-cylinder, and it should have the same density as element 1 to minimize buoyant forces. The index of refraction of the sheet 17, the liquid 18, and the optically transmissive upper portion of elements 1 should all be approximately equal. The elements 1 should be roughly balanced to minimize gross gravitational orientation.

In addition to controlling the torque as given by eq. (1), the micro-mirror thickness d and density $\rho_m$ can be varied to achieve a preferred overall density for the ball. The micro-mirror thickness is purposely shown thinner here than in the previous figures, to illustrate the achievement of a lower overall density. To reduce friction and other retarding forces, it is very important for the ball to match the density of the encompassing lubricating fluid 18 so that it will be buoyed up to float in the fluid and not sink to the bottom because it is too dense, or float to the top because its density is too low. It is also important for the dielectric of the ball to match the index of refraction of the encompassing lubricating fluid 18, and both should match the index of refraction of the sheet 17 which houses the balls (made of semi-balls 6T and 6B), fluid 18, and concentric cavities 19. It is not easy to find a dielectric material which meets both matching requirements of density and index of refraction. This is where being able to vary the thickness d and density $\rho_m$ of the mirror material becomes paramount.

In the case of a spherical ball, for a given density $\rho_m$ of the mirror, and density $\rho_d$ of the dielectric, to match the fluid density $\rho_f$, the mirror thickness d should be $$d = \frac{\frac{4}{3}\pi r^3 (\rho_f - \rho_d)}{\pi r^2 (\rho_m - \rho_d)}. \qquad (3)$$

In the case of a spherical ball, for a given mirror thickness d, and density $\rho_d$ of the dielectric, to match the fluid density $\rho_f$, the mirror density $\rho_m$ should be $$\rho_m = \frac{\frac{4}{3}\pi r^3 (\rho_f - \rho_d) + \pi r^2 d \rho_d}{\pi r^2 d}. \qquad (4)$$

Matching the density of the fluid 18 by adjusting the mirror thickness and/or density has the advantage of maintaining gross symmetry in the balls, and is thus preferred as they will thus be roughly balanced to minimize gross gravitational orientation. Another way to match the density of the fluid 18 is to adjust the bottom semi-sphere density by adding or removing weight in voids in the bottom semi-sphere which need not be transparent.

Let us now look at various possible embodiments of the instant invention for the addressing electrodes. The different configurations shown, and combinations of them can operate to align the elements 1 and track the sun, or other light source in a non-solar application. A conducting, but highly resistive material like Indium/Tin Oxide (ITO) can be sputtered on the sheets that contain the elements 1 to form the addressing electrodes. The optically transparency of ITO makes it ideally suited for addressing the balls.

Figure 2A:
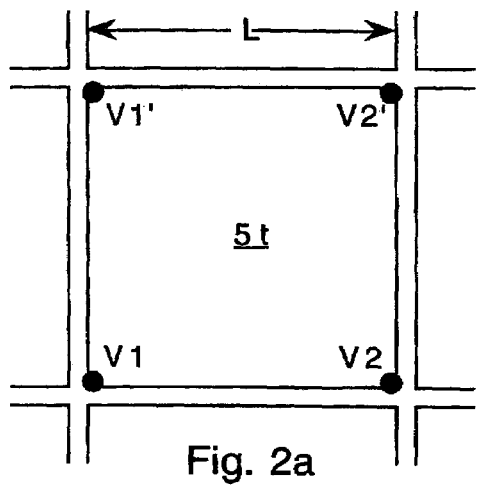
FIG. 2a represents a top view of an array of partitioned highly resistive electrodes showing in detail a top view of one such electrode and the voltages at its four corners.

FIG. 2a represents a top view of an array of partitioned highly resistive electrodes with grid spacing L showing in detail a top view of one such electrode 5*t* and the voltages at its four corners. Voltages V1 and V2 correspond to voltages V1 and V2 shown in the cross sectional FIGS. 1*d*, 1*e*, and 1*f*. Voltages V1' and V2' are the voltages at the corners of this top electrode 5*t* below the plane of the paper. Each partitioned electrode is made of a highly resistive thin transparent conductor such as an alloy of indium tin oxide (ITO).

Figure 2B:
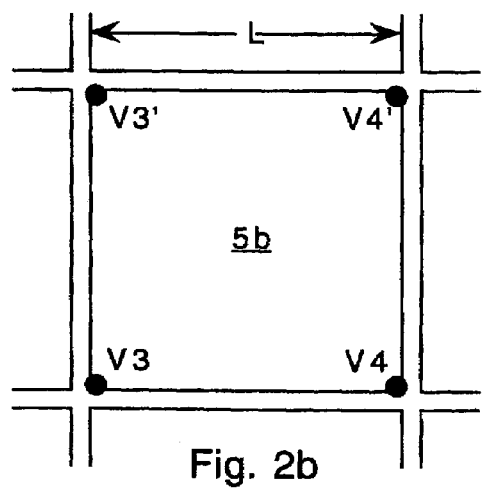
FIG. 2b represents a bottom view of an array of partitioned highly resistive electrodes showing in detail a view of a bottom electrode and the voltages at its four corners.

FIG. 2*b* represents a bottom view of an array of partitioned highly resistive electrodes with grid spacing L showing in detail a view of a bottom electrode 5*b* and the voltages at its four corners. Voltages V3 and V4 correspond to voltages V3 and V4 shown in the cross sectional FIGS. 1*d*, 1*e*, and 1*f*. Voltages V3' and V4' are the voltages at the corners of this bottom electrode 5*b* below the plane of the paper.

Figure 3A:
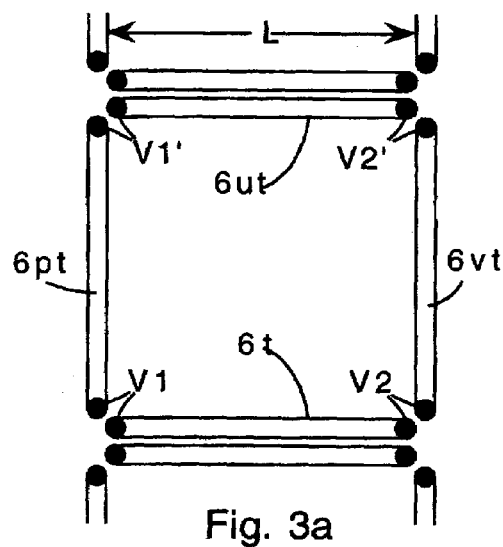
FIG. 3a represents a top view of an array of fragmented highly resistive wire electrodes showing in detail a top view of a set of four such adjacent electrodes and the voltages at their ends.

FIG. 3*a* represents a top view of an array of fragmented highly resistive wire electrodes with grid spacing L showing in detail a top view of a set of four such adjacent electrodes and the voltages at their ends. At the top, wire electrode 6*t* has voltages V1 and V2 at its ends which correspond to voltages V1 and V2 shown in the cross sectional FIGS. 1*d*, 1*e*, and 1*f*. Wire electrode 6*pt* is a wire perpendicular to the plane of the paper with voltages V1 and V1' at its ends. Wire electrode 6*vt* is a vertical wire with respect to the plane of the paper with voltages V2 and V2' at its ends. Wire electrode 6*ut* has voltages V1' and V2' at its ends, and is under the top electrode 6*t*. Each fragmented wire electrode is made of a highly resistive thin transparent conductor such as an alloy of indium tin oxide (ITO).

Figure 3B:
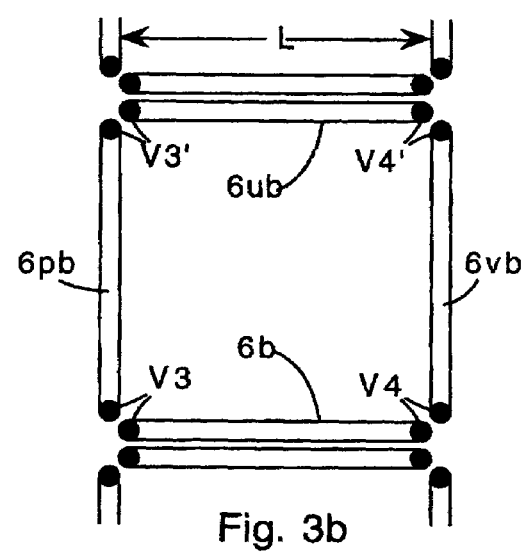
FIG. 3b represents a bottom view of an array of fragmented highly resistive wire electrodes showing in detail a bottom view of a set of four such adjacent electrodes and the voltages at their ends.

FIG. 3*b* represents a bottom view of an array of fragmented highly resistive wire electrodes with grid spacing L showing in detail a bottom view of a set of four such adjacent electrodes and the voltages at their ends. At the bottom, wire electrode 6*b* has voltages V3 and V4 at its ends which correspond to voltages V3 and V4 shown in the cross sectional FIGS. 1*d*, 1*e*, and 1*f*. Wire electrode 6*pb* is a wire perpendicular to the plane of the paper with voltages V3 and V3' at its ends. Wire electrode 6*vb* is a vertical wire with respect to the plane of the paper with voltages V4 and V4' at its ends. Wire electrode 6*ub* has voltages V4 and V4' at its ends, and is under electrode 6*b*.

Operational Modes

Let us consider various combinations of the electrodes and their advantages and disadvantages. The partitioned electrodes 5*t* and 5*b* of FIGS. 2*a* and 2*b* may be operated as a pair. The advantage of doing this is that the most approximately uniform electric fields may thus be created here with only a negligible amount of fringing fields at the edges. A disadvantage of this configuration is that it has the smallest optical transparency since the incident light must be transmitted and reflected through each partitioned electrode of, for example, transparent ITO.

Operating the fragmented wire electrodes of FIGS. 3*a* and 3*b* as a pair has the advantage of providing the greatest transparency since the wire electrodes have a small cross section with most of the light passing between them. Thus a larger percentage of the incident light will be reflected to the receiver. A disadvantage of this configuration is that it produces the least uniform electric fields. Yet because of symmetry, the components of the field that diverge from uniformity cancel, and a main component remains to align the elements (balls and cylinders) in the same direction as would be provided by the corresponding uniform electric field that partitioned electrodes would produce. This configuration has the further advantage that when the top side becomes worn or soiled, this configuration can be turned over so the pristine bottom side can be used on top with a high transparency to the incident and reflected light.

The presently preferred configuration is the fragmented wire electrodes of FIG. 3*a* on top to receive the light, combined with the partitioned electrodes of FIG. 2*b* on the bottom so that the combination more closely approximates the desired uniform electric field. With the fragmented wire electrodes configuration on top, the same large percentage of the incident light will be reflected to the receiver as for the configuration of fragmented wire electrodes on both top and bottom.

In order to accomplish alignment economically, one can use a pulsed voltage source, when the elements 1 need only be aligned intermittently. The elements 1 (balls and cylinders) may be individually oriented, or groups may be collectively aligned to simplify tracking and focussing. When groups are collectively oriented, as a group they may have a projected group concavity to aid in the focussing to the receiver. The number of mirrors per grid cell are a design variable. The voltages can be controlled by a small microprocessor (computer) with analog voltage outputs.

There is a trade-off between complexity of the grid, and size of the power supply and control system. One element per grid cell is the maximum complexity of the grid and control system, and presents the minimal requirement for the power supply. Unlike displays that require high resolution, groups of balls may be collectively oriented to simplify tracking and focussing. When groups are collectively oriented as a group they may have a projected group concavity to aid in the focussing to the collector. Only intermittent alignment of the elements is necessary in the tracking of the sun, so a pulsed or step function voltage source may be used. An intermittent use of large voltage is much less difficult to achieve than the same steady state voltage.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

The invention claimed is:

1. A micro-optics solar concentrator comprising:
   a) an array of micro-mirrors embedded in rotatable dielectric balls;
   b) means for producing an induced electric dipole in the dielectric material of each of said rotatable dielectric balls;
   c) opposingly faced pairs of electrodes in a grid array for coupling to said induced electric dipole;
   d) means for selectively addressing a pair of said electrodes; and
   e) means for establishing independent voltages at the corners of said electrodes.

2. The apparatus of claim 1, wherein an electric dipole is induced in each micro-mirror.

3. The apparatus of claim 1, wherein said pair of electrodes are fragmented wires forming the edges of the top and bottom faces of a rectangular parallelepiped.

4. The apparatus of claim 1, wherein said pair of electrodes are partitioned rectangular top and bottom sides of a rectangular parallelepiped.

5. The apparatus of claim 1, wherein the index of refraction of the balls is greater than 1.2.

6. A focussing and directing concentrator of reflected light comprising:
   a) an array of rotatable mirrored dielectric balls embedded in cavities in an optically transmissive sheet;
   b) each of said mirrored balls encapsulated in a surrounding medium of an optically transmissive fluid lubricant;
   c) means for producing an induced electric dipole in said rotatable dielectric balls;
   d) opposingly faced pairs of electrodes in a grid array for coupling to said induced electric dipole;
   e) means for selectively addressing a pair of said electrodes; and
   f) means for establishing independent voltages at the corners of said electrodes.

7. The apparatus of claim 6, wherein an electric dipole is induced in each micro-mirror.

8. The apparatus of claim 6, wherein said pair of electrodes are fragmented wires forming the edges of the top and bottom faces of a rectangular parallelepiped.

9. The apparatus of claim 6, wherein said pair of electrodes are partitioned rectangular top and bottom sides of a rectangular parallelepiped.

10. The apparatus of claim 6, wherein one electrode forms the partitioned rectangular side of one face of a rectangular parallelepiped that is opposite a fragmented wire electrode forming the side edges of the opposite face.

11. The apparatus of claim 6, wherein the dielectric constant of the balls is greater than 1.4.

12. The apparatus of claim 6, wherein the index of refraction of the balls is greater than 1.2.

13. The apparatus of claim 6, wherein the density of said fluid lubricant is matched by adjusting the mirror thickness.

14. The apparatus of claim 6, wherein the density of said fluid lubricant is matched by adjusting the mirror density.

15. Apparatus for focusing and directing concentrated reflected light comprising:
   a) an array of rotatable mirrored dielectric balls embedded in cavities in an optically transmissive sheet;
   b) means for producing an induced electric dipole in the a hemisphere of each of said rotatable dielectric balls;
   c) opposingly faced pairs of electrodes comprising an ensemble of grid array cells for coupling to said induced electric dipole;
   d) at least one of said balls in each grid array cell;
   e) means for selectively addressing a pair of said electrodes; and
   f) means for establishing independent voltages at the corners of said electrodes.

16. The apparatus of claim 15, wherein an electric dipole is induced in the hemisphere of each ball.

17. The apparatus of claim 15, wherein the dielectric constant of the hemisphere of each ball is greater than 1.2.

18. The apparatus of claim 15, wherein the dipole induced in the dielectric hemispheres acts in harmony with the dipole induced in each mirror.

19. The apparatus of claim 15, wherein the dipole induced in the dielectric hemispheres dominates over the dipole induced in each mirror.

20. The apparatus of claim 15, wherein the dipole induced in the dielectric hemispheres acts in harmony with the dipole of an electret embedded in each ball.

* * * * *